United States Patent [19]

Braden et al.

[11] Patent Number: 4,718,620

[45] Date of Patent: Jan. 12, 1988

[54] TERRACED CHANNELS FOR REDUCING AFTERBODY DRAG

[76] Inventors: John A. Braden, 2791 Okawana Dr., Marietta, Ga. 30067; Charles J. Dixon, 3261 Hickory Crest Dr., Marietta, Ga. 30064

[21] Appl. No.: 660,708

[22] Filed: Oct. 15, 1984

[51] Int. Cl.$^4$ .............................................. B64C 1/38
[52] U.S. Cl. .................................. 244/130; 244/199; 244/200
[58] Field of Search ..................... 244/130, 200, 199

[56] References Cited

U.S. PATENT DOCUMENTS

| 1,554,843 | 9/1925 | Daynix | 244/200 |
| 2,800,291 | 7/1957 | Stephens | 244/200 |
| 3,419,232 | 12/1968 | McStay et al. | 244/199 |
| 3,578,264 | 5/1971 | Kuethe | 244/199 |
| 4,455,045 | 6/1984 | Wheeler | 244/200 |

Primary Examiner—Galen Barefoot
Assistant Examiner—Mark R. Valliere

[57] ABSTRACT

A fluid flow control for reducing the drag associated with an upswept afterbody includes a pair of ridges forming substantially symmetric flow channels arranged in an approximately helical fashion on either side of the afterbody so as to intersect at approximately the centerline of the undersurface. Each ridge has a generally rearward pitch so that the flow channels form a substantially V-shaped configuration rearwardly. The flow channels cross the local fluid flow streamlines at an optimum angle for producing a strong vortex core along the channel length with the vortex rotating in a direction counter to that normally found in the wake of conventional upswept afterbodies.

12 Claims, 7 Drawing Figures

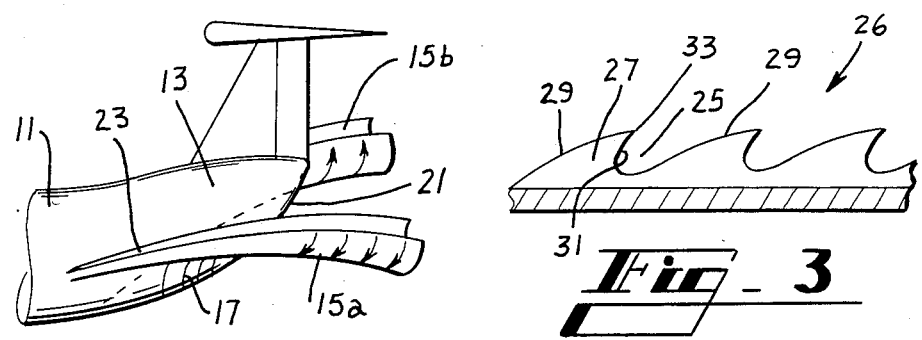
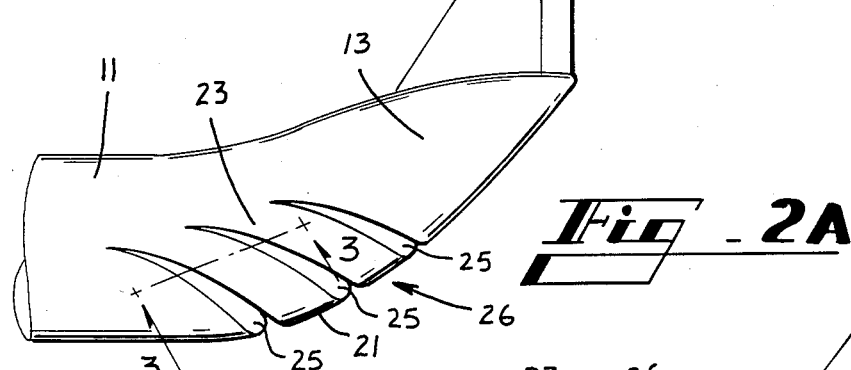
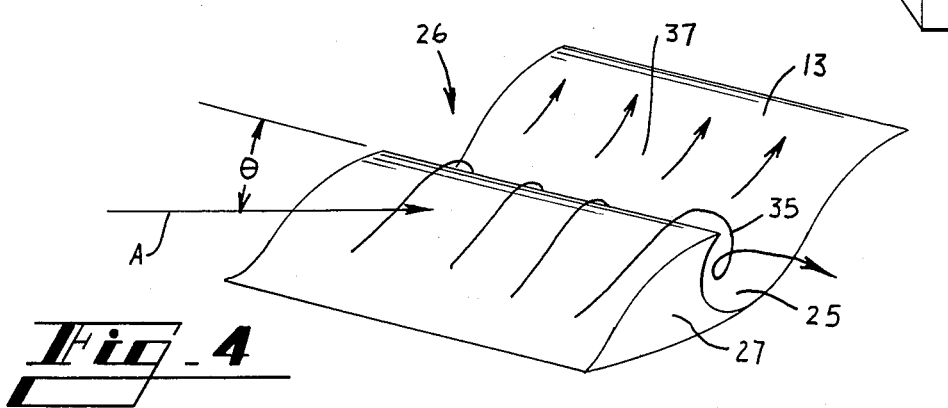

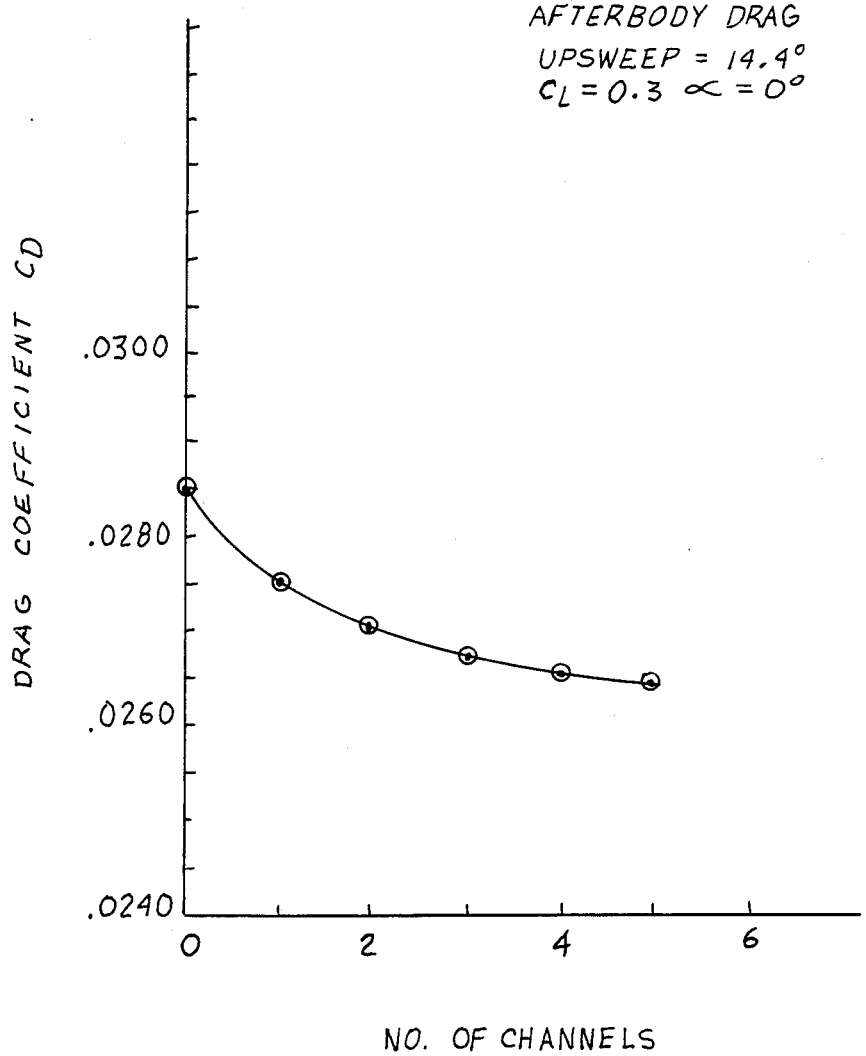

TERRACED CHANNELS FOR REDUCING AFTERBODY DRAG

TECHNICAL FIELD

This invention generally relates to fluid flow control devices and more particularly to such a device that is designed to minimize undesirable vortex drag and fluid flow separation resulting from the fluid flow dynamics of an upswept afterbody.

BACKGROUND ART

Cargo aircraft, typically, have upswept afterbodies in order to facilitate the loading and unloading of cargo via the aft cargo door. The aerodynamic flowfield generated by the downwash from the lifting wing, usually positioned ahead of the upswept body, in combination with that of the body itself, is highly three-dimensional in form and can produce excessive aerodynamic drag forces on the aircraft. Both lift and drag forces produced on the afterbody by this complex flow field are derived from frictional effects on the body surface due to the viscous nature of the air, pressure forces which are governed primarily by the flow of air around the body shape, and the ability of a viscous boundary layer adjacent to the body surface to remain attached. With a large amount of afterbody upsweep, these basic aerodynamic properties can combine in such a manner so that a strong vortex system is shed into the wake producing yet another aerodynamic force, vortex drag, which is a characteristic aerodynamic phenomenon associated with the highly upswept afterbody. The onset of vortex drag is usually accompanied by boundary layer separation on the body surface which further compounds the aircraft drag problem.

The development of frictional forces on aerodynamic surfaces is confined chiefly to the action of the air within the boundary layer which is an extremely thin layer of fluid adjacent to the solid surface. Essentially, at the surface itself, the air is at rest, while immediately above successive layers slide over each other thereby exerting a a frictional drag force that is proportional to the viscosity of the flowing medium. Aerodynamically. it is desirable to keep the boundary layer attached to the surface thereby precluding an additional pressure drag force attendant to the separation of the boundary layer from the surface.

The tendency for the boundary layer to remain attached or to separate from the body surface is governed by the distribution of surface pressures on the body itself. A positive pressure gradient, i.e. an increasing rate of change of pressure, along with viscous drag, tends to slow the fluid motion and over an extended length of contact with the surface, the innermost portion of the fluid can be brought to rest at the separation point. In fact, from points downstream, a reverse flow back towards the separation point can be produced. For the upswept afterbody, this aerodynamic effect results in a breaking away of the streamlines from the body aft-surface leaving an area of low pressure, i.e. pressures drag, between the two lines of separation points on either side of the body. If the shape of the body and its basic flow field is inherently disposed toward producing a vortex wake, the breakaway streamlines will roll up into a vortex pair that trail downstream with significant amounts of wasted energy contained in the rotational flow.

To best describe the disposition of the upswept afterbody for producing a vortex-dominated wake, an analogy can be made to a low aspect ratio (small span relative to the chord length) three-dimensional wing. Under lifting conditions. a strong vortex trails from both wing tips as a consequence of the pressure differential existing between the wing upper-surface (low pressure) and the lower-surface (high pressure). At the wing tip, the air flows from the high pressure region around the tip surface towards the lower pressure creating a rotational flow field (vortex) which trails off into the wake. The upswept afterbody can be considered as aerodynamically analogous to an inverted, exceptionally low aspect ratio wing trailing a vortex pair and with negative lift produced by the positive upsweep of the body aft end (negative camber in terms of the wing analogy). For cargo aircraft, the negative lift produced by the upswept fuselage must be recovered by the main wing by increasing the angle of attack of the wing-body combination. This process produces yet another detrimental drag force on the system—an increase in wing induced drag which would not be necessary except for the negative lift produced by the fuselage upsweep.

With the intent of reducing the foregoing combination of frictional, pressure, vortex and induced drags characterizing the upswept fuselage, a wide variety of devices have been employed. These would include strakes, fences, blowing jets, vortex generators and body reshaping. Some success has been achieved with strakes attached to the afterbody lower surface so as to change the position, character and strength of the shed vortex. To date, such drag reductions have been only partially successful in offsetting the potential levels of drag known to be present in the total wing-body-vortex system.

As a related subject of research, attempts have been made to reduce the base drag of bluff, axisymmetric bodies, such as circular cylinders with cut-off or conical bases, by using longitudinal grooves cut lengthwise into the body surface. Results have been reported on by Howard, F. G., Weinstein, L. M. and Bushell, D. M. in "Longtiduinal Afterbody Grooves and Shoulder Radiusing for Low-Speed Bluff Body Drag Reduction"; ASME Winter Annual Meeting, Washington, D, C., Nov. 1981. Base drag for three-dimensional bodies is primarily a function of the friction drag of the forebody, the subsequent thickening of the boundary layer as the base is approached, and the severity of the angle of cutoff of the base. Shoulder radiusing, boat-tailing and in the instance cited longitudinal grooves, are recognized aerodynamic concepts which can provide some drag relief for bluff bodies exhibiting high levels of base drag. One problem experienced with the longitudinal grooves, however, has been that the effectiveness of the grooves tends to diminish with increasing Reynolds number thus negating their value at full scale flight conditions. Additionally, attempts to influence the drag of an upswept afterbody by the addition of simple rectangular or "V"-shaped grooves placed both longitudinally or at an angle to the local streamlines have not been successful and, in most cases, a drag increase has been noted.

DISCLOSURE OF THE INVENTION

It is, therefore, an object of the present invention to provide a fluid control device for reducing the drag of an upswept afterbody.

It is another object of the present invention to provide a fluid control device for delaying flow separation from an upswept afterbody and for favorably redistributing the vorticity shed from the upswept afterbody so as to reduce drag.

One advantage of the present invention is that the pair of strong trailing vortices with attendant areas of flow separation on the upswept afterbody undersurface and potentially high drag associated with this characteristic flow field can be significantly controlled and suppressed by adding either incised channels or raised protuberances to the afterbody surface such that a terraced afterbody contour is produced.

Another advantage of the present invention is the ability to retrofit the fluid control device to existing upswept afterbodies exhibiting undesirable levels of vortex drag.

In accordance with the present invention, there is provided a fluid flow control device for reducing the vortex drag associated with an upswept afterbody having sides and an undersurface. The device comprises a pair of ridges used for forming one of more especially designed flow channels arranged in an approximate helical fashion on both sides of the afterbody. Each ridge has a generally downward and rearward pitch so as to intersect at approximately the centerline of the undersurface. Further, each ridge forms the associated flow channel so as to be positioned to cross the local fluid flow streamlines at an optimum angle for producing a strong vortex core along length of the channel. This results in a redistribution and attenuation of the rotational energy of the trailing vortex system while simultaneously suppressing the separation of the fluid flow from the afterbody sides and undersurface.

The ridge of the fluid control device comprises an upstream surface having a generally convex shape and a downstream surface having a generally concave configuration. This produces a cross-sectional shape which is generally wave-like in appearance.

The number, position, and depth of the flow channels formed by the ridges are controlled by the external shape of the candidate afterbody as well as the intended cruise flight speed and lift conditions.

The flow channel is positioned so as to cross the local fluid flow streamline at an angle having a range of about 20 degrees to about 35 degrees to produce a strong vortex core along the channel length; the optimum angle is approximately 30 degrees.

BRIEF DESCRIPTION OF THE DRAWINGS

FIG. 1 illustrates the drag-inducing pair of vortices typically generated by an unmodified upswept afterbody;

FIGS. 2A-2B illustrate a side view and bottom view, respectively, of the fluid flow control device in accordance with the present invention;

FIG. 3 is a sectional view of the fluid flow control device taken along line 3—3 of FIG. 2;

FIG. 4 is a perspective view of the ridge and associated flow channel of the fluid flow control device and illustrates the flow configuration of the local fluid flow streamlines; and FIG. 5 illustrates typical drag reductions obtained from wind tunnel tests of the fluid flow control devices applied to an upswept afterbody;

BEST MODE FOR CARRYING OUT THE INVENTION

Figure 6A:
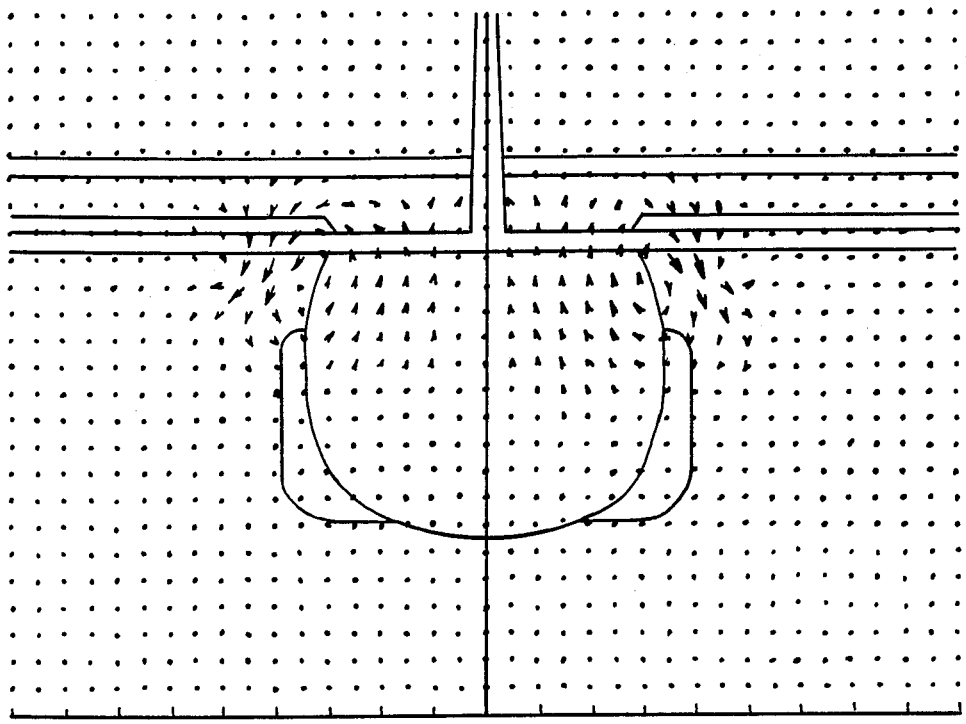
FIG. 6A-6B are test surveys obtained in the wake of an upswept afterbody with and without the fluid flow control devices applied.

FIG. 1 illustrates a cargo-type aircraft 11 having an upswept afterbody 13 which typically exhibits a pair of strong trailing vortices 15a, 15b with attendant areas of flow separation 17 on the afterbody undersurface 21 and sides 23. The trailing vortices 15a and 15b contribute a significant addition to the total aircraft drag and the low pressure wake, resulting from the flow separation 17. This gives rise to the characteristic high drag of the upswept afterbody.

The high drag associated with the characteristic flow-field described above is significantly controlled and suppressed by adding a fluid flow control device, generally seen at 26, comprising incised flow channels or raised protuberances which form flow channels. Referring to FIGS. 2A-2B, the afterbody 13 is provided with flow channels 25 along the sides 23 and the undersurface 21. The flow channels 25 generate secondary vortices which rotate counter to the direction of vortices 15a and 15b, in the streamwise direction, to suppress, redistribute and attenuate the rotational energy contained in vortices 15a and 15b. Simultaneously, these secondary vortices suppress flow separation from the afterbody 13 and minimize the negative lift produced by the unmodified afterbody 13. These effects result in an overall drag reduction for an aircraft in cruise flight as will be more fully described hereinafter.

In its simplest form, the fluid flow control device 26 comrises a pair of ridges 27a and 27b, forming symmetric flow channels 25a, 25b, as shown in FIG. 2B, The ridges 27a, 27b are aranged in approximately a helical fashion on either side 23 of the afterbody 13 so as to intersect at approximately the centerline of the undersurface 21. Each ridge 27 has a generally rearward pitch such that the symmetric flow channels 25 have, in planform, FIG. 2B, a substantially V-shaped configuration closing rearwardly.

The ridges 27a, 27b form the associated flow channels 25a, 25b such that these channels are positioned to cross the local fluid streamlines at an optimum angle for producing a strong vortex core along the length of the channel 25. The angle between the local fluid flow streamlines and channel 29 ranges from about 20 degress to about 35 degrees, the optimum angle being about 30 degrees.

The number, position, and depth of the flow channels formed by the ridges 27 are controlled by the external shape of the candidate afterbody 13, the relative positioning of the wing and body and as well, the intended cruise speed and lifting performance of the wing. Further, each ridge 27 forms the associated flow channel 25 such that the depth of the channel 25 generally increases as the channel progresses from the sides 23 of the afterbody 13 to the underside 21.

As illustrated by FIG. 5, the reduction in drag improves as the number of flow channels is increased. Therefore, preferably, the fluid flow control device 26 of the present invention comprises a series of ridges 27 and flow channels 25 along the sides 23 and undersurface 21 of the afterbody 13 as shown by FIGS. 2A-2B. The downstream/edge of the ridges 27 are faired off to blend in with the leading edge of an adjacent ridge such that a terraced configuration is formed as will be described in further detail hereinafter Referring to FIG. 3, a cross-sectional view of the series of ridges 27 is iilustrated. Each ridge 27 comprises an upstream surface 27 having a generally convex configuration and a downstream surface 31 having a generally concave configuration to form the associated flow channel 25. Preferably, the trailing edge 33 of the ridge 27 overlies a portion of the upstream surface 29 of an adjacent downstream ridge to form the associated flow channel 25. In cross-section, the ridges are wave-like in form.

The operation of the fluid flow control device 26 is best understood with reference to FIG. 4. Arrow A represents the local fluid flow streamline adjacent to the ridge 27. The angle $\theta$ formed between the local fluid flow streamline A is selected at the optimum angle for producing a strong secondary vortex 35 along the length of the flow channel 25. The vortex 35 has a rotation counter to the rotation of the trailing vortex 15 so as to suppress, redistribute and attenuate the rotational energy of this trailing vortex 15. The angle $\theta$ ranges between about 20 degrees to about 35 degrees, the optimum angle being about 30 degrees.

Simultaneously, the secondary vortex suppresses fluid flow separation from the surface of the afterbody 13. Suppression of the flow separation is facilitated by the vortex 35, which is locked along the flow channel 25. This vortex 35 rotates in a direction which causes the local fluid flow streamlines to flow above the vortex 25 and then be deflected downward so as to become reattached to the surface of the afterbody 13 aft of the vortex 35 at 37.

Figure 6B:
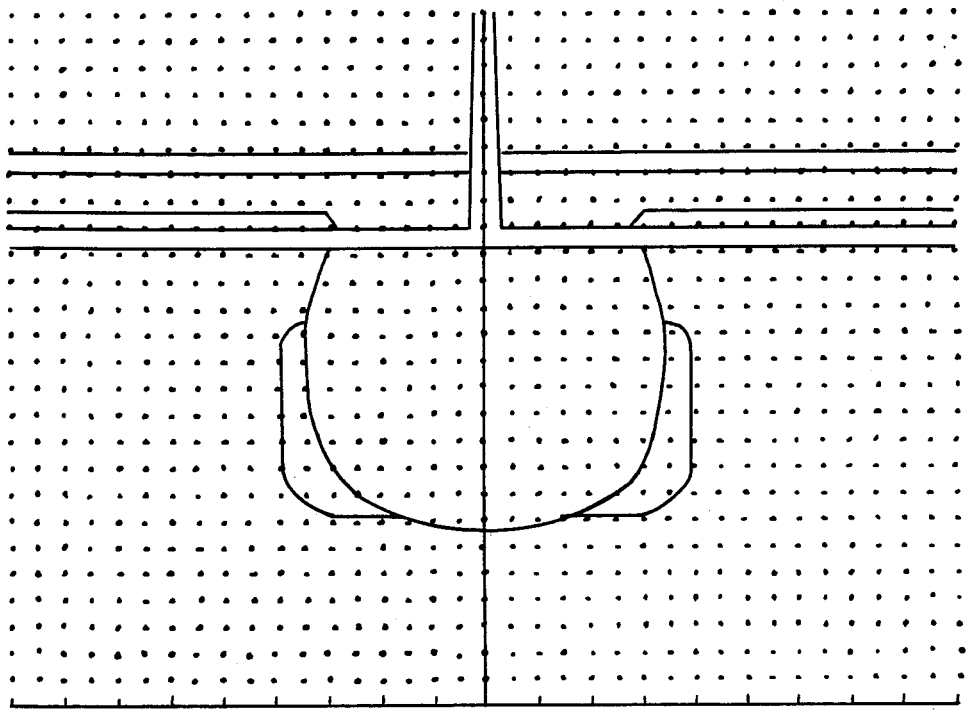

Referring to FIG. 6, a wake survey is illustrated with the fluid flow control device 26 applied to the upswept afterbody 13. As shown, the trailing vortices 15a, 15b have been redistributed and attenuated. With the additional effect of suppressing flow separation, the device 26 results in an overall drag reduction as illustrated by FIG. 5.

The terraced channels of the present invention can be incised or cut into the afterbody of an aircraft or added on in the form of protuberances. If added on by the shaping of ridges or the like to form the terraced channels, the invention can take the form of a large pliable sheet which is attached to the afterbody surface by suitable means such as adhesives or fasteners.

While the invention has been hereinabove illustrated and described with specific reference to a cargo-type afterbody, it is equally applicable to other afterbodies having an upswept configuration with minor variations and modifications. None of these variations are deemed to constitute a departure from the invention as embraced by the appended claims.

We claim:

1. A fluid flow control device for reducing the vorticity discharged from and drag associated with an aircraft having an upswept body afterbody having sides and an undersurface comprising:

(a) a series of longitudinally spaced pairs of ridges forming symmetric flow channels arranged in approximately a helical fashion on either side of the afterbody so as to intersect at approximately the centerline of the undersurface;
    (b) each ridge having a generally rearward pitch such that the symmetric flow channels have a substantially trough-like configuration; and each ridge forming the associated flow channel so as to be positioned to cross local fluid flow streamlines at an optimum angle for producing a strong vortex core having a rotational direction opposite to that of the vorticity discharged from the respective side of the afterbody along the length of the channel; whereby there is a redistribution and attenuation of the rotational energy of a trailing vortex system as well as a suppression of fluid flow separation from the afterbody.

2. The fluid flow control device according to claim 1, wherein the ridge comprises an upstream surface having a generally convex configuration and a downstream surface having a generally concave configuration to form the associated flow channel.

3. The fluid flow control device of claim 2, wherein the flow channel is positioned at the optimum angle having a range of about 20° to about 35° to produce a strong vortex core along the channel length.

4. The fluid flow device of claim 3, wherein the optimum angle is about 30°.

5. The fluid flow device of claim 1, comprises a series of ridges and associated flow channels along the sides and undersurface of the afterbody.

6. The fluid flow control device of claim 5, wherein each ridge of the series has a concave upstream surface and a convex downstream surface to form the associated flow channel.

7. The fluid flow control device of claim 6, wherein the downstream edge of each ridge is faired off to blend in with the leading edge of an adjacent ridge.

8. The fluid flow control device of claim 7, wherein the trailing edge of a ridge overlies a portion of the upstream surface of an adjacent downstream ridge to form the associated flow channel.

9. The fluid flow control device of claim 8, wherein each flow channel is positioned at the optimum angle for facilitating a strong vortex core along the channel length, the angle ranging from about 20° to about 35°.

10. The fluid flow control device of claim 9, wherein the optimum angle is about 30°.

11. The fluid flow control device of claim 5, wherein the ridges are formed by incising the channels into the afterbody.

12. The fluid flow control device of claim 6, wherein the ridges are added onto the afterbody.

* * * * *